US006535652B2

(12) United States Patent
Nakatsuka

(10) Patent No.: US 6,535,652 B2
(45) **Date of Patent: *Mar. 18, 2003**

(54) IMAGE RETRIEVAL APPARATUS AND METHOD, AND COMPUTER-READABLE MEMORY THEREFOR

(75) Inventor: Tadanori Nakatsuka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,785

(22) Filed: Jan. 29, 1999

(65) Prior Publication Data

US 2002/0054706 A1 May 9, 2002

(30) Foreign Application Priority Data

Feb. 5, 1998 (JP) .......................................... 10-024887

(51) Int. Cl.[7] ............................ G06K 9/00; G06K 9/68; H04N 1/00; G06F 17/30

(52) U.S. Cl. ....................... 382/305; 382/165; 382/218; 382/219; 358/403; 707/1; 707/3; 707/6

(58) Field of Search ................................ 382/305, 282, 382/224, 185, 187, 190, 164, 165; 707/528, 500, 502, 1; 385/403

(56) References Cited

U.S. PATENT DOCUMENTS

| | | | | |
|---|---|---|---|---|
| 5,586,197 A | * | 12/1996 | Tsujimura et al. | 382/162 |
| 5,652,881 A | * | 7/1997 | Takahashi et al. | 395/615 |
| 5,689,342 A | | 11/1997 | Nakatsuka | |
| 5,893,095 A | * | 4/1999 | Jain et al. | 707/6 |
| 5,991,466 A | * | 11/1999 | Ushiro et al. | 382/305 |

FOREIGN PATENT DOCUMENTS

| | | |
|---|---|---|
| JP | 6-96275 | 6/1994 |

* cited by examiner

*Primary Examiner*—Leo Boudreau
*Assistant Examiner*—Yosef Kassa
(74) *Attorney, Agent, or Firm*—Fitzpatrick, Cella, Harper & Scinto

(57) ABSTRACT

A character string serving as search criteria is input from an input unit. The image data is partitioned into areas on a per-attribute basis by an area partitioning unit, and the color of an area having a prescribed attribute is discriminated by a color discriminating unit among the areas obtained by partitioning. A recognition unit applies character recognition to the area having the prescribed attribute. The entered character string and a recognized character string are compared, and image data conforming to the search criteria is output to a display unit based upon the results of the comparison.

13 Claims, 4 Drawing Sheets

IMAGE RETRIEVAL APPARATUS AND METHOD, AND COMPUTER-READABLE MEMORY THEREFOR

BACKGROUND OF THE INVENTION

This invention relates to an image retrieval apparatus and method for retrieving desired image data from a database that manages image data, and to a computer-readable memory for such image retrieval.

In a conventional image retrieval apparatus for retrieving desired image data from a database that manages image data, images managed by the database are reduced in size and displayed on a display and the user is allowed to select the desired image. Alternatively, a keyword is assigned to each image and the keyword is used to retrieve the desired image.

With such an image retrieval apparatus according to the prior art, however, the method of retrieving desired image data from the displayed images of reduced size does not make it possible to automate retrieval. Further, the method of retrieving image data using keywords is such that it is difficult to assign appropriate keywords when the images are registered. Though retrieval of desired image data by keyword is achieved, it is difficult to retrieve the desired image without error.

SUMMARY OF THE INVENTION

Accordingly, an object of the present invention is to provide an image retrieval apparatus and method whereby desired image data can be retrieved at a high speed and accuracy, as well as a computer-readable memory for such image retrieval.

According to the present invention, the foregoing object is attained by providing an image retrieval apparatus for retrieving desired image data from a database that manages image data, comprising: input means for inputting a character string serving as search criteria; partitioning means for partitioning the image data into areas on a per-attribute basis; color discrimination means for discriminating color of an area having a prescribed attribute, the area being among the areas obtained by partitioning by the partitioning means; character recognition means for subjecting the area having the prescribed attribute to character recognition based upon the color discriminated by the color discrimination means; comparison means for comparing the character string input by the input means with a character string recognized by the character recognition means; and output means for outputting image data conforming to the search criteria based upon results of the comparison performed by the comparison means.

Further, according to the present invention, the foregoing object is attained by providing an image retrieval method for retrieving desired image data from a database that manages image data, comprising: an input step of inputting a character string serving as search criteria; a partitioning step of partitioning the image data into areas on a per-attribute basis; a color discrimination step of discriminating color of an area having a prescribed attribute, the area being among the areas obtained by partitioning at the partitioning step; a character recognition step of subjecting the area having the prescribed attribute to character recognition based upon the color discriminated at the color discrimination step; a comparison step of comparing the character string input at the input step with a character string recognized at the character recognition step; and an output step of outputting image data conforming to the search criteria based upon results of the comparison performed at the comparison step.

Further, according to the present invention, the foregoing object is attained by providing a computer-readable memory storing program code for image retrieval for retrieving desired image data from a database that manages image data, comprising: program code of an input step of inputting a character string serving as search criteria; program code of a partitioning step of partitioning the image data into areas on a per-attribute basis; program code of a color discrimination step of discriminating color of an area having a prescribed attribute, the area being among the areas obtained by partitioning at the partitioning step; program code of a character recognition step of subjecting the area having the prescribed attribute to character recognition based upon the color discriminated at the color discrimination step; program code of a comparison step of comparing the character string input at the input step with a character string recognized at the character recognition step; and program code of an output step of outputting image data conforming to the search criteria based upon results of the comparison performed at the comparison step.

Thus, in accordance with the present invention, as described above, it is possible to provide an image retrieval apparatus and method whereby desired images can be retrieved at a high speed and accuracy, as well as a computer-readable memory for such image retrieval.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
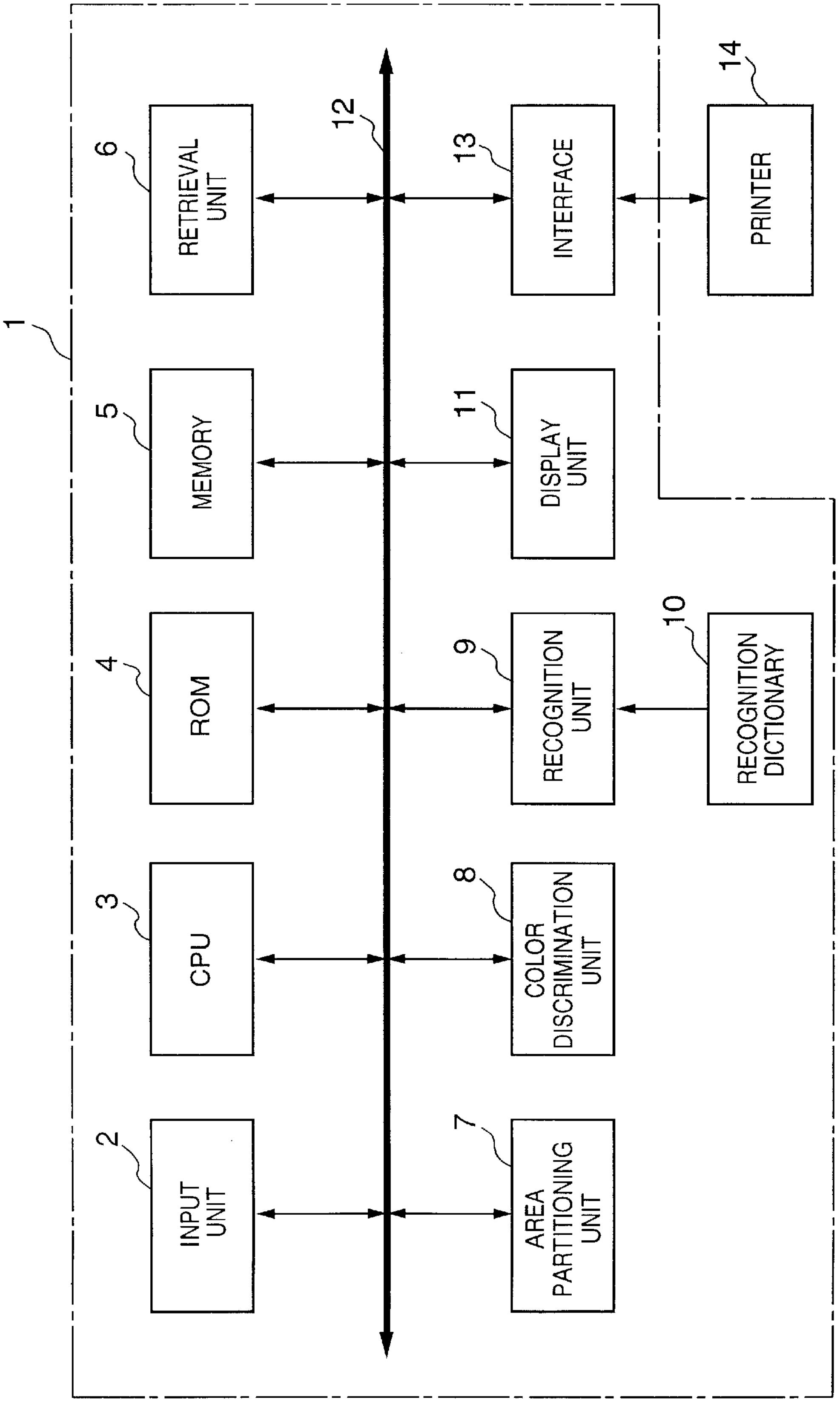
FIG. 1 is a block diagram illustrating the general construction of an image retrieval apparatus according to an embodiment of the present invention.

FIG. 1 is a block diagram illustrating the general construction of an image retrieval apparatus according to an embodiment of the present invention.

Shown in FIG. 1 is an image retrieval apparatus 1 according to the present invention. The apparatus includes an input unit 2 for inputting image data. The input unit 2 reads in a color document by a color scanner or enters color image data that has been stored on a hard disk or in a server or computer of another terminal connected by a public line or LAN. In addition, the input unit 2 enters a search character in which text of a specific color included in the image data serves as search criteria. The search character is composed of a set of two items of data, namely a character code entered by a keyboard or handwriting input device and color information (e.g., red, blue, black, etc.). The entered search character is preserved in a memory 5 and waits for the start of processing shown in the flowchart of FIG. 3, described later. A central processing unit (CPU) 3 executes processing for controlling the overall image retrieval apparatus 1. A ROM 4 stores a control program and various data for executing the flowchart shown in FIG. 3. The memory 5 is a RAM used as the working area of the CPU 3 and has an area for storing image data entered from the input unit 2, an area for storing the position and size of an area discriminated by an area partitioning unit 7, and an area for storing color information discriminated by a color discrimination unit 8. A retrieval unit 6 retrieves image data from the results of character recognition of text of a specific color based upon the entered search character.

The area partitioning unit 7 partitions and extracts areas such as text, tables, figures and pictures contained in the image data stored in the memory 5, and stores the positions, sizes and attributes (text, table, figure, picture) of these areas in the memory 5 in association with the image data from which the areas have been extracted. The color discrimination unit 8 analyzes the color components of the image data that has been stored in the memory 5 and discriminates the color of text or the like contained in the image data. A recognition unit 9 uses a recognition dictionary 10 to apply character recognition to text contained in the image data. A display unit 11 displays retrieved image data as well as the area occupied by this image data in the image data. A system bus 12, which includes a data bus, address bus and control-signal bus from the CPU 3, interconnects the components of the apparatus. An interface 13 controls the interfacing with an external output device such as a printer 14.

Figure 2:
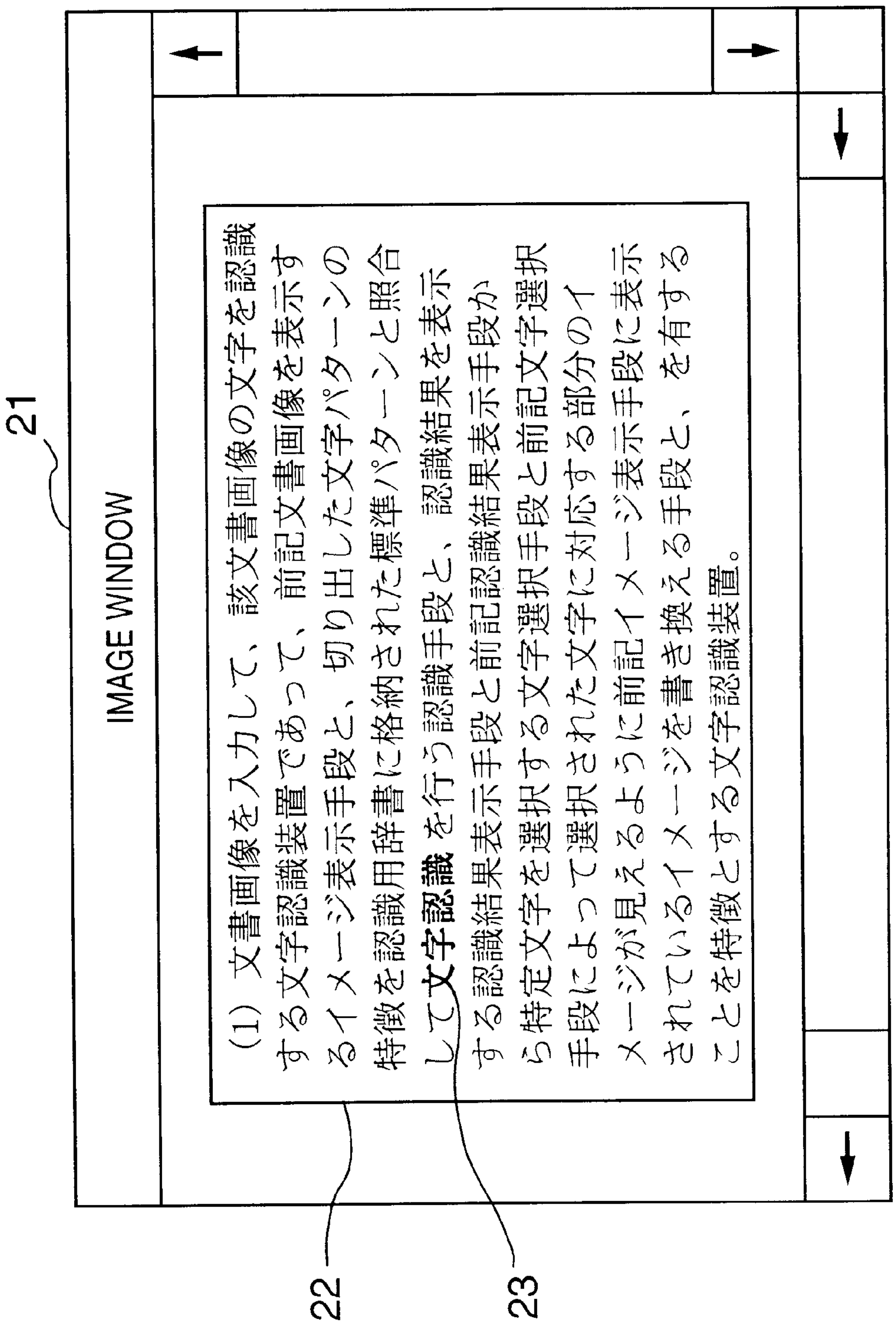
FIG. 2 is a diagram showing an example of a display on a display unit in the image retrieval apparatus according to the embodiment of the present invention.

FIG. 2 is a diagram showing an example of an image window which displays an image retrieved by the image retrieval apparatus according to this embodiment of the present invention, as well as the attribute of an area.

As shown in FIG. 2, an image window 21 displayed on the display unit 11 displays image data that has been retrieved by the retrieval unit 6. An area 22 has been discriminated as text in the result of area partitioning performed by the area partitioning unit 7. FIG. 2 shows an example in which a document containing a text area having a Japanese text string printed horizontally has been entered from the input unit 2 and stored in the memory 5, with the text area, which is part of the image data, being displayed as the result of retrieval. The four-character pattern 文字認識 indicated at numeral 23 is a character string displayed in the color red and a word meaning "character recognition"; all other characters are displayed in black. The reason for this is that in the original document entered as image data, the character strings were printed in the colors indicated in FIG. 2.

Figure 3:
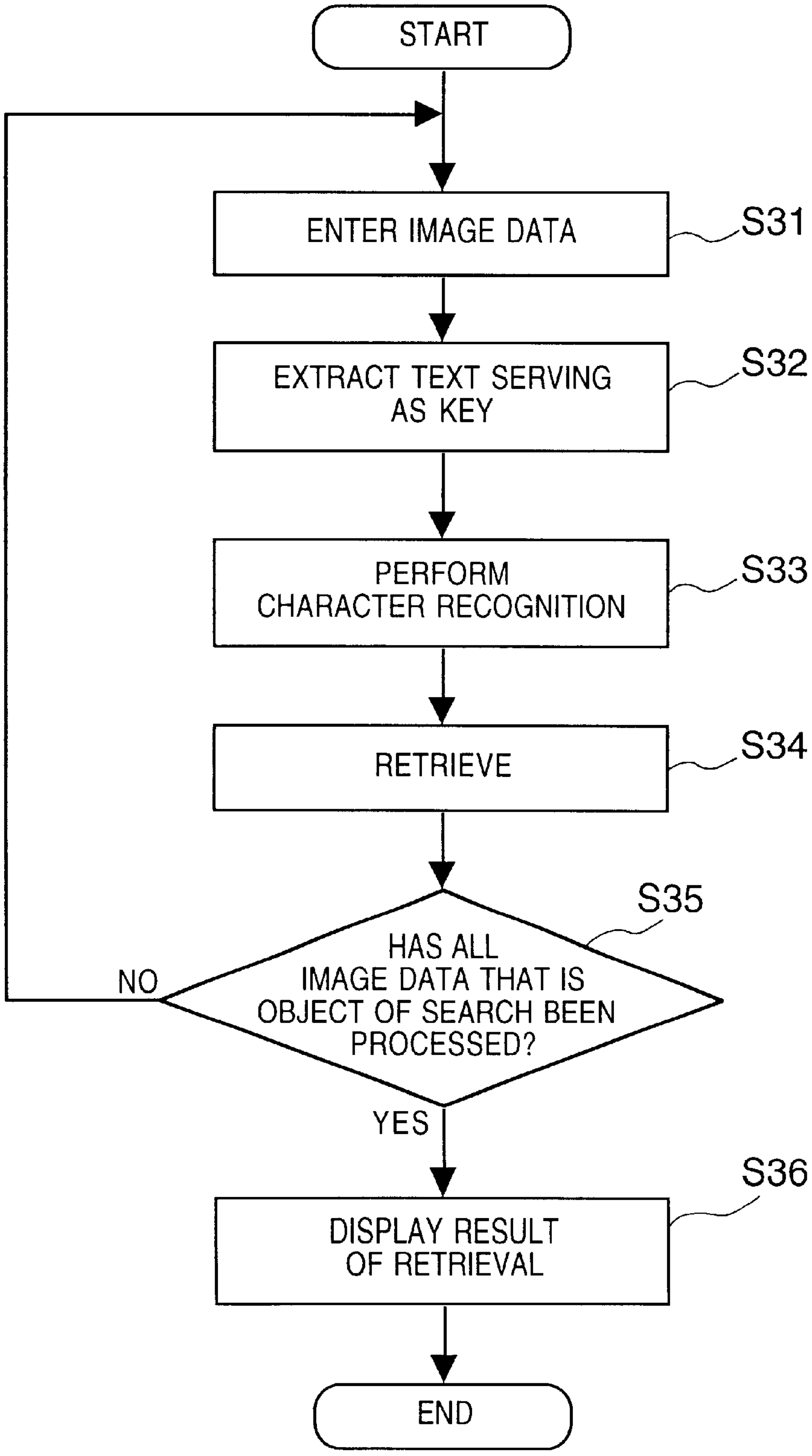
FIG. 3 is a flowchart showing processing executed by the image retrieval apparatus according to the embodiment of the present invention.

FIG. 3 is a flowchart showing processing executed by the image retrieval apparatus 1 according to this embodiment of the present invention. It should be noted that the control program for executing this processing has been stored in the ROM 4.

First, image data that is the object of a search is read in from a hard disk or the like and stored in the memory 5 at step S31. A search character for retrieving desired image data is input from the input unit 2. Next, at step S32, text serving as a key is extracted from the image data that has been stored in the memory 5. Though area data indicative of text, figures, tables, pictures and ruled lines and the like is extracted by the area partitioning performed by the area partitioning unit 7, here it will suffice to the text area at minimum. Though any method may be employed for area partitioning, here the area partitioning method described in the specification of Japanese Patent Application Laid-Open (KOKAI) No. 6-96275 is used, by way of example. The colors of character strings contained in the text area that has been extracted are discriminated by the color discrimination unit 8 and text having the color data entered by the user as the search character is extracted. This processing may include reading color data that has been preserved in the memory 5, extracting bits (pixels) having color data identical with the search color data from the image data in the area discriminated as the text area, and writing these bits at corresponding positions of a bitmap area in the memory 5. The pixel extraction may be performed by providing the search color data with a predetermined range and extracting all pixels having color data that fall within or near this range. Since color data following this operation is no longer necessary, the writing of data to the memory 5 may be performed by writing "1"s to the corresponding pixel positions.

Next, at step S33, the image data in memory 5 extracted at step S32 is subjected to character recognition to achieve conversion to the character code of the image data. This is followed by step S34, at which the result of character recognition obtained at step S33 is compared with the search character specified by the user. Whether or not the image data contains the same character is determined by the retrieval unit 6 based upon whether the two character codes match. If the same character is contained in the image data, then this image data is judged to be the image data that was the object of the search conducted by the user and information identifying this image data is stored in the memory 5 as the result of retrieval.

Next, it is determined at step S35 whether all image data that is the object of the search has been subjected to the processing of steps S31 to S34. If all image data has not been subjected to the processing of steps S31 to S34 ("NO" at step S35), then control returns to step S31 and the processing of steps S31 to S34 is executed again. If all image data has been subjected to the processing of steps S31 to S34 ("YES" at step S35), then control proceeds to step S36 and the result of retrieval is displayed. Further, in a case where the search characters retained in the memory 5 are plural in number, the processing of steps S31 to S35 is applied to each search character. As for display of the results of retrieval, all of the text data is displayed regardless of whether it is the color specified for the search. Further, all image data may be displayed inclusive of areas other than text areas.

Thus, in accordance with the embodiment as described above, the fact that retrieval is performed using a character having a specified color as search criteria makes it possible to perform retrieval automatically at a high speed and accuracy even if the amount of image data that is the object of the search is large. This makes it possible to realize an image retrieval apparatus that is easy to use and that makes it easier to retrieve image data.

Figure 4:
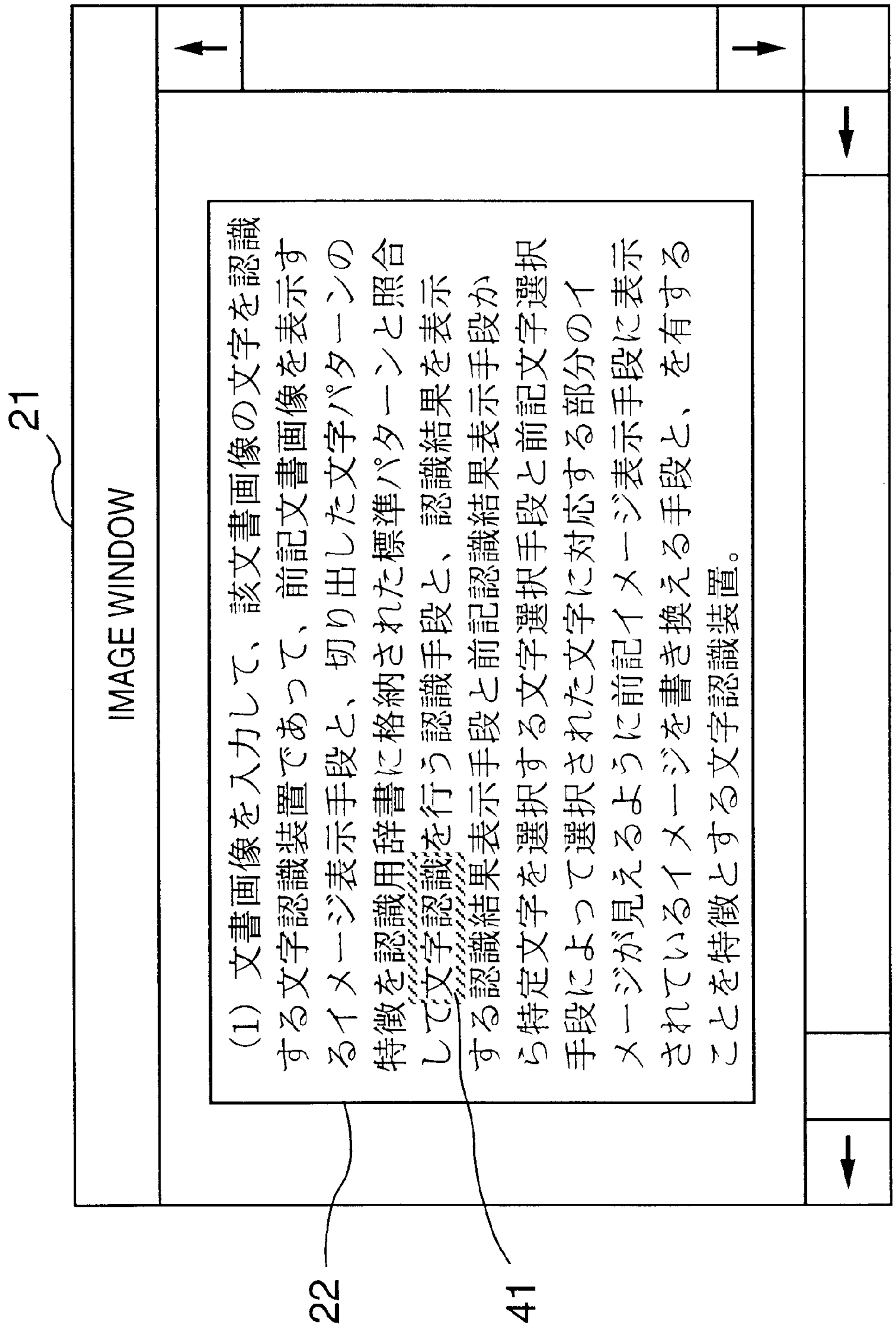
FIG. 4 is a diagram showing another example of a display on a display unit in the image retrieval apparatus according to the embodiment of the present invention.

Though a character having a specific color is adopted as the search criteria at step S32 in FIG. 3, an arrangement may be adopted in which a character colored by a marker or the like is adopted as the search criteria, as shown at 41 in FIG. 4. In this case a pixel having color data that matches the search color data is discriminated at the time of image extraction at step S32, a portion in which such pixels are concentrated is extracted in the form of a rectangular area and is written to the memory 5, thereby making it possible to extract a portion colored by a marker. Since a plurality of colors are included in this case, writing to the memory 5 is carried out as is in the form of multivalued data, binarization processing is executed so as to effect partitioning into the color of the marker and the color of the character pattern, and then the character recognition processing at step S33 is executed. This arrangement makes it possible to obtain actions and effects similar to those of the embodiment described above.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image retrieval apparatus for retrieving desired image data from a database that stores a plurality of image data, comprising:

input means for inputting a character string having a specific color serving as search criteria;

extraction means for extracting a text area having color data identical to the specific color from the plurality of image data;

character recognition means for recognizing the extracted text area;

comparison means for comparing the character string having the specific color with a character string recognized by said character recognition means;

searching means for searching and specifying an image data which includes the text area containing the character string having the specific color on the basis of the comparison result from image data having the extracted text area; and output means for outputting the specified image data as a search result for the search criteria.

2. The apparatus according to claim 1, further comprising:

image input means for in-putting an image data; and said input means extracting the character string having the specific color from the image data input by the image input means.

3. The apparatus according to claim 1, the character string having the specific color is colored by a marker.

4. The apparatus according to claim 1, wherein the output means outputs a display image.

5. The apparatus according to claim 4, wherein said output means displays an area of the display image, which includes the character string having the specific color, said area being from image data conforming to the search criteria.

6. The apparatus according to claim 1, wherein the searching means searches the database on a basis of character recognition result of each image data stored in the database.

7. An image retrieval method for retrieving desired image data from a database that manages image data, comprising:

an input step, of inputting a character string having a specific color serving as search criteria;

an extracting step, of extracting a text area having color data identical to the specific color from the plurality of image data;

a character recognizing step, of recognizing the extracted text area;

a comparing step, of comparing the character string having the specific color with a character string recognized in said character recognizing step;

a searching step, of searching and specifying an image data which includes the text area containing the character string having the specific color on the basis of the comparison result from image data having the extracted text area; and an output step, of outputting the specified image data as a search result for the search criteria.

8. The method according to claim 7, further comprising:

an image input step of inputting an image data; and said input step extracting the character string having the specific color from the image data input by the image input step.

9. The method according to claim 7, further comprising the step of coloring the character string having the specific color by a marker.

10. The method according to claim 7, wherein the output step includes outputting a display image.

11. The method according to claim 10, wherein said output step includes displaying an area of the display image which includes the character string having the specific color, said area being from image data conforming to the search criteria.

12. The method according to claim 7, wherein the searching step includes searching the database on a basis of a character recognition result of each image data stored in the database.

13. A computer readable memory storing program code for image retrieval for retrieving desired image data from a database that manages image data, comprising:

program code of an input step, of inputting a character string having a specific color serving as search criteria;

program code of an extracting step, of extracting a text area having color data identical to the specific color from the plurality of image data;

program code of a character recognizing step, of recognizing the extracted text area;

program code of a comparing step, of comparing the character string having the specific color with a character string recognized in said character recognizing step;

program code of a searching step, of searching and specifying an image data which includes the text area containing the character string having the specific color on the basis of the comparison result from image data having the extracted text area; and program code of an output step, of outputting the specified image data as a search result for the search criteria.

* * * * *

UNITED STATES PATENT AND TRADEMARK OFFICE

CERTIFICATE OF CORRECTION

PATENT NO. : 6,535,652 B2
DATED : March 18, 2003
INVENTOR(S) : Tadanori Nakatsuka It is certified that error appears in the above-identified patent and that said Letters Patent is hereby corrected as shown below:

<u>Column 6,</u>
Line 2, “in-putting” should read -- inputting --;
Line 6, “claim 1,” should read -- claim 1, wherein --; and
Line 57, “computer readable” should read -- computer-readable --.

Signed and Sealed this

Thirtieth Day of September, 2003

JAMES E. ROGAN
*Director of the United States Patent and Trademark Office*